Patented Mar. 29, 1938

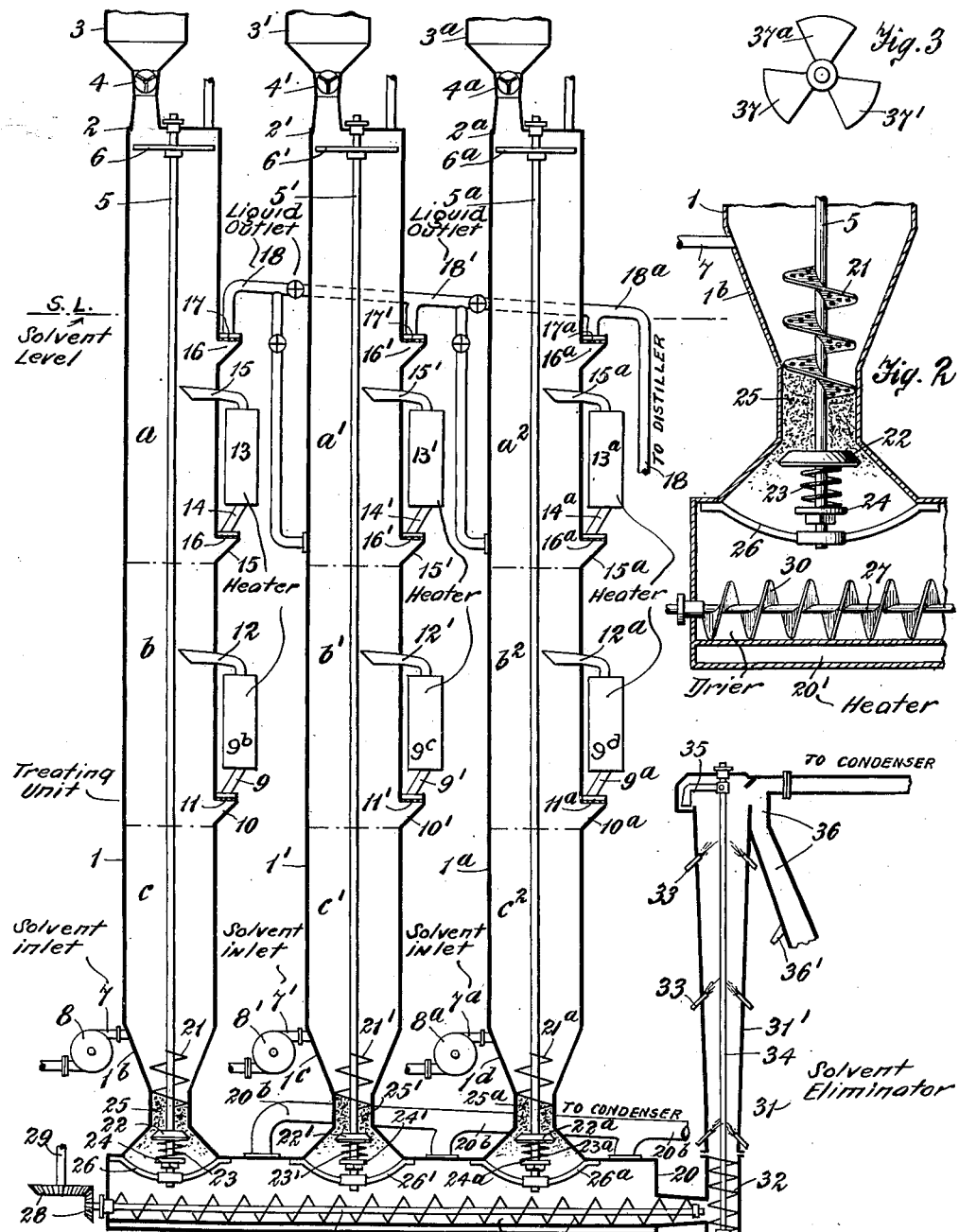

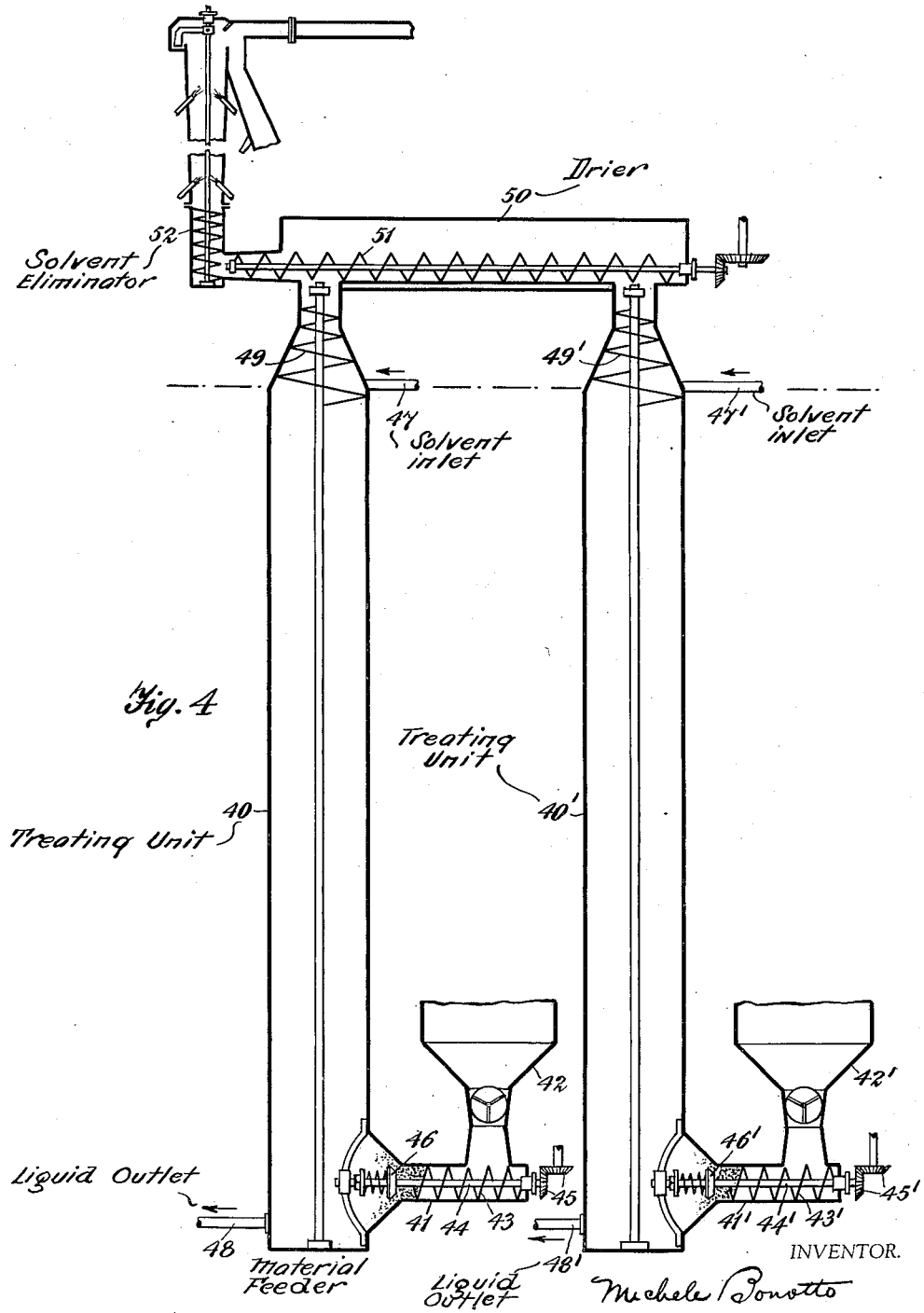

2,112,805

UNITED STATES PATENT OFFICE 2,112,805

PROCESS FOR EXTRACTING OILS AND FATS FROM MATERIALS CONTAINING THE SAME

Michele Bonotto, Evansville, Ind., assignor to Extractol Process, Ltd., Wilmington, Del., a corporation of Delaware Application December 11, 1934, Serial No. 757,008

3 Claims. (Cl. 87—6)

This invention relates to improvements in process for extraction of oils, fats and other soluble constituents from material containing the same.

In oleaginous or oil-bearing materials, such as cotton seed, soya beans, tung nuts, linseed, castor beans, copra, bone meal, meat scraps and the like, the oil constituents are contained in cells and the cells are surrounded by membranes or tissues and it has been found that when these oil-bearing materials are subjected to the action of a suitable solvent or diffusion agent under proper conditions, these membranes in some cases will act like semi-permeable diaphragms to permit the osmotic discharge of the oil constituents from the cells, while in other cases, such membranes or films will act like permeable diaphragms to permit diffusion to take place between said oil constituents and the solvent or diffusion agent and in either case enabling the extraction of the oil constituents from the cells and enabling osmotic discharge or diffusion and consequent extraction of the oil constituents from the cells.

It is desirable that the oil from such material be extracted in a continuous counter-current process in which fresh solvent or diffusion agent having maximum strength will be applied to outgoing material from which a part of the oil has theretofore been extracted and used solvent or diffusion agent, of less strength will be applied to the fresh or incoming material and the diffusion agent or solvent will be thoroughly intermingled and kept in intimate contact with the mass of oil-bearing material for a time period sufficient to enable such osmotic action or diffusion to take place as distinguished from a mere washing operation. The determination of the length or duration of this time period will depend upon the type of material being treated, the condition of such material, the strength of the diffusion agent or solvent and other factors, such as the temperature maintained.

My present invention comprises a continuous, counter current process or system capable of use generally for the extraction of soluble ingredients by solvent or diffusion agent from any materials embodying the same. It is useful in extracting oil from any oil-bearing materials and is particularly useful in the extraction of oil from oil-bearing materials of the type which during conveyance by screw-conveyors or the like in conventional processes become pulverized and block the system. It will be understood that in conventional continuous, counter current processes for the extraction of oil from certain oil bearing materials, the material, during the process of extraction of oil therefrom, is conveyed for considerable distances by conveyor screws, and during such conveyance, such material is pulverized and blocks the process.

It is one of the objects of this invention, therefore, to provide a process for the extraction of oil and/or other ingredients from materials bearing the same which will not only avoid the use during the extraction process of screw conveyors or other mechanical mechanism or means for continuously moving the material relatively to the solvent and thus avoid the consequent pulverization of the material with a blocking of the system but at the same time will enable subjection of the continuously moving material in counter-current to the solvent or diffusion agent.

Another object of my invention is to enable subjection of such continuously moving material to solvent or diffusion agent in zones employing solvents or agents of varying strengths, thus promoting efficient extraction of the oil content of the material.

Still another object of my invention is to provide a process having in a single tank a plurality or series of extraction zones preferably comprising an initial material-treating zone employing used solvent, an intermediate material treating zone employing stronger used solvent and a final material-treating zone employing fresh solvent, and to provide said plurality or series of treating zones in a single tank without the use of conveyor mechanism.

Still another object of my invention is to provide a continuous counter-current process of the type under consideration which will be capable of use in a vertically-disposed treating tank to take advantage of the movement of the material due to the difference in specific weights of the solvent and material, so that when a solvent or diffusion agent of a specific weight lighter than the specific weight of the material is employed, (whereby the material will tend to gravitate to the bottom of the tank), the solvent will be fed into the treating tank at the bottom portion thereof while the material will be fed into the tank at the top; and when a solvent having a specific weight greater than the specific weight of the material being treated is employed, (whereby the material will be buoyant and tend to rise through the solvent), then the material is fed at the bottom of the treating tank and the solvent is fed into said tank at the top thereof.

Another object of my invention is, in a process of the type specified, not only to take advantage of natural forces, such as gravity or buoyancy, to convey or move the material but to control the feed and temperature of the solvent in order first, to provide a plurality or series of extraction zones which will utilize, in counter-current, used solvent for the initial treatment, fresh solvent for the final extraction treatment of the material, and secondly will maintain or keep in each of such zones a substantially uniform solvent of a given enrichment, so that the material in passing through such zones will be subjected to solvents of different strengths.

Another object of my invention to provide a plurality of treating zones in a vertically-disposed tank and to feed liquid solvent and material therethrough in directions reverse to that of the normal movement of material through the given solvent employed and also to provide in such tank zones which though not mechanically or physically separated or partitioned from each other, will enable the substantial separation of the different strata of freshness or enrichment of solvent or diffusion agent in the several zones so as to produce efficient extraction during passage of the material through such treating zones.

With these and other objects in view, the invention comprises the combination of elements and arrangement of process steps so combined as to co-act and cooperate with each other in the performance of the functions and the accomplishment of the results herein contemplated.

Fig. 1 is a diagrammatic view showing a process or system comprising a series of tanks, each of which constitutes a zoned extraction unit of my invention and is adapted for use with a solvent of a specific weight which is less than the specific weight of the material to be treated whereby the material will normally gravitate to the bottom;

Fig. 2 is an enlarged section of the bottom portion of an extractor unit embodying my invention and communicating with a drier or solvent evaporator such as shown in Fig. 1;

Fig. 3 is a view in plan of a modified form of pressure applying screw such as shown in Figs. 1 and 2;

Fig. 4 is a diagrammatic view of tanks showing my invention applied to a system in which the specific weight of the material is less than the specific weight of the solvent so that such material fed at the bottom will be buoyant and rise to the top.

Referring now to Figs. 1 and 2 of these drawings which illustrate a preferred embodiment of my invention, $I$, $I'$ and $I^a$ indicate a series of vertically-disposed treating-tanks, each of which comprises an extractor or treating unit suitable for employment or use with a solvent or diffusion agent of a specific weight which is lighter than the specific weight of the material so that such material when fed in at the tops 2, 2' and 2ᵃ of the said tanks through the hoppers 3, 3' and 3ᵃ will normally gravitate toward the bottom of the said tanks.

In the embodiment shown, the hoppers are provided with the usual valves 4, 4', 4ᵃ and the said tanks which may, for example, be forty feet (40') more or less in height, have suitably mounted therein axially-disposed shafts 5, 5' and 5ᵃ which may be rotated from any suitable source of power not shown. I preferably mount on these shafts, adjacent to the upper end thereof, material-distributing platforms 6, 6', 6ᵃ so that material which is preferably flaked; when fed through the hoppers 3, 3' and 3ᵃ will be properly distributed within the tanks.

In the preferred embodiment of my invention illustrated in Fig. 1, the tanks are adapted to be filled, to the line SL, with solvent or diffusion agent having a specific weight which is less than the specific weight of the material to be treated so that such material when fed into the tanks through the hoppers 3, 3', 3ᵃ will gravitate through the diffusion agent or solvent to the bottom of the tanks, and in order to provide a continuous counter-current process the said solvent is fed into the tanks through the pipes 7, 7', 7ᵃ at the bottom portions thereof, and means is provided for preventing the normal downward flow out of the tanks through the bottoms thereof of said solvent while at the same time permitting outward movement at said bottoms of the treated or extracted material. Said solvent is preferably fed into the said tanks under pressure by the pumps 8, 8' and 8ᵃ and is supplied from any suitable source of supply not shown. In the tanks shown in Fig. 1, I provide without mechanical or physical separation three treating or extraction zones which I shall term initial treating zones $a$, $a'$ and $a^2$, intermediate treating zones $b$, $b'$ and $b^2$, and final treating zones $c$, $c'$ and $c^2$. The pressure and temperature of solvent in these extraction zones is preferably controlled to permit efficient oil extraction in each of such zones. Thus I preferably apply through the pumps 8, 8', 8ᵃ sufficient pressure to cause solvent in said final-treating zones $c$, $c'$ and $c^2$ when it receives a given oil enrichment to rise into the adjacent intermediate zones $b$, $b'$ and $b^2$ and also to prevent penetration of the enriched solvent from said adjacent intermediate zones into said final zones, thus maintaining final treating zones in which the material will always be subjected to fresh solvent. In these intermediate zones the enriched solvent is heated to a suitable given degree of temperature and said enriched solvent is preferably heated and circulated by means of one or more heaters 9ᵇ, 9ᶜ and 9ᵈ. These heaters, as illustrated, surround pipes or conduits 9, 9' and 9ᵃ extending upwardly from elbows 10, 10', 10ᵃ provided with filtering members 11, 11' and 11ᵃ. Said pipes or conduits extend upwardly for a suitable distance and then project in through the walls of the tanks as shown at 12, 12', 12ᵃ, the ends thereof being provided with hoods, this arrangement being such that when a suitable heat is applied through the heaters 9ᵇ, 9ᶜ and 9ᵈ a circulation will be caused through the conduit 9 and the solvent or diffusion agent portions in the intermediate zones $b$, $b'$, $b^2$ will be circulated. In such units I thus provide intermediate zones having a degree of heat which will not only accelerate and promote the extracting function of the solvent or diffusion agent but will assist in causing the extracted oil to rise upwardly and also in maintaining the intermediate zones $b$, $b'$ and $b^2$, separate with a solvent of a given oil enrichment and preventing downward movement of such oil enriched solvent into the final treating zones $c$, $c'$ and $c^2$, it being understood that as solvent is enriched in the final treating zone it will move or flow upwardly into the intermediate zone, but enriched solvent in the intermediate zone will not move or pass downwardly into the final extraction zone. The enriched solvent in the zones $b$, $b'$ and $b^2$ are similarly maintained free from substantial intermixing with solvent from the adjacent zones $a$, $a'$ and $a^2$ respectively by providing in each of the said zones $a$, $a'$ and $a^2$ a heating and circulating element separate from the heaters in the intermediate zones. As shown the said zones $a$, $a'$ and $a^2$ are provided with heating elements 13, 13', 13ª surrounding pipes or conduits 14, 14' and 14ª extending from elbows 15, 15' and 15ª provided with filter elements 16, 16' and 16ª. These heating elements are preferably heated to a different and higher degree than the heaters 9ᵇ, 9ᶜ and 9ᵈ and enriched solvent maintained at a higher temperature than in the intermediate zone will be circulated through the pipes 14, 14' and 14ª through the heater and conduits 15, 15' and 15ª into the tank, the said inlet conduits for the heated solvent each having hoods similar to those hereinabove described to prevent entrance of material thereto.

When the solvent portions in these initial zones $a$, $a'$, $a^2$ are heated to a different and higher degree of temperature than the solvent portions in the intermediate zones $b$, $b'$ and $b^2$, the solvent portions in a tank will tend to be graded into three grades of solvent, namely, an initial used or oil-enriched solvent of suitable given strength, an intermediate zone having a grade of solvent of greater strength than that of the initial zone and a final treating zone having a grade of solvent which will be substantially all fresh solvent. Fresh material fed into the top of the tank will, therefore, first be subjected in the zones $a$, $a'$, $a^2$ to said used solvent of given strength after which the same material in the intermediate zones will be subjected to solvent or diffusion agent of greater strength and said material in the final zones will be subjected to still stronger solvent portions in substantially fresh condition. The oil-enriched solvent in the lower zones having passed upwardly to the intermediate zones and the additionally oil-enriched solvent in the intermediate zones having passed upwardly to the initial zones, and there being still further enriched will pass outwardly through the elbows 16, 16', 16ª, filtering elements 17, 17', 17ª and conduits 18, 18' and 18ª to the outlet pipe or section 18ᵇ from which the enriched solvent may be conducted to a suitable separating element such as a distiller.

The material is passed or moved through the extracting zones in the tanks without the use of mechanical appliances or conveyors which are likely to cause pulverization of such material and during the solvent extraction of the oil therefrom will finally gravitate to the bottom of the tank where I preferably utilize the material itself to form a liquid impermeable plug which will prevent downward passage of solvent in the tanks. At said tank bottom, I preferably cause the material to be continuously squeezed into a continuously renewed liquid-impermeable plug the bottom portions of which are then discharged into a drier 20 having a heating element 20'. In the embodiment shown, all of the extracting units communicate with a single drier. As illustrated, the tanks 1, 1' and 1ª are contracted at their lower ends into inverted frustro-conic sections 1ᵇ, 1ᶜ, 1ᵈ, and each of the shafts 5, 5', 5ª are provided, adjacent to these lower end sections with screws 21, 21', 21ª which are adapted to squeeze the extracted material against spring pressed valve members 22, 22', 22ª also mounted on said shaft, the springs 23, 23', 23ª as shown abutting against adjustable abutments 24, 24', 24ª so that the pressure of the spring against the valve may be suitably adjusted. This arrangement causes the material at the lower end of the tanks to be squeezed to form impermeable plugs 25, 25', 25ª which are continuously renewed at their upper ends and continuously broken up at their lower ends. Such plugs of material will prevent solvent from passing downwardly through the valves 22, 22', 22ª into the drier and provide my preferred means for closing the bottoms of the tanks so as to enable liquid solvent to be fed through inlets at the bottoms thereof and to be discharged through the outlets at the upper end thereof.

In the embodiment of my invention shown the shafts 5 are mounted at the lower end in brackets 26, 26', 26ª attached to the upper wall of the drier 20 and said drier is provided with a heating element or steam jacket 20' and has mounted therein a horizontal shaft 27 rotated at one end by pinions 28 and shaft 29 from any suitable source of power not shown. Said shaft 27 has mounted thereon a suitable horizontally-disposed conveyor screw 30 adapted to convey material deposited thereon into a vertically-disposed solvent eliminating tank 31, having mounted at its bottom portion a vertical conveyor screw 32 adapted to force material upwardly through an upper outwardly-divergent portion 31', through the walls of which portion are passed a series of steam-jet nozzles 33 from which superheated steam is adapted to pass into and through and to impinge against the material passing upwardly in said section. The steam injected through these jets is preferably progressively heated to higher degrees of temperature and the steam of these jets will entrain and carry with it any traces of solvent which remain after treatment in the drier 20. In this tank the conveying screw 32 is mounted upon an axially disposed shaft 34 rotated from any suitable source of power not shown and this shaft has provided at its upper end an agitator or pusher 35 for the purpose of forcing material coming in contact therewith in the delivery conduit 26 which may be connected at its lower end to any suitable outlet and as shown this delivery conduit is provided with a small sampler tube 36'.

In Fig. 2, I have shown the screw-conveyor or squeezing member perforated along its spirals. If desired the squeezing element may be modified by having a series of spirally-arranged wings 37, 37' and 37ª mounted on the shaft 34 (instead of the conveyor screw 32) as shown in Fig. 3.

In Fig. 4, I have shown a modified form of my invention adapted for use with solvent having a specific weight which is greater than the specific weight of the material so that the material will be buoyant and rise through the solvent. In this embodiment of my invention, two tanks 40 and 40' are shown into which the material is fed at the bottom. As illustrated, horizontal material conduits 41, 41' are connected at one end with the tanks and are provided with hoppers 42, 42' at their other ends. The conduits 41, 41' have means for forcing into the tanks the material and for preventing flow of solvent through said conduits, and as shown, the material is squeezed against spring-pressed and adjustable valves 46, 46' by conveyor-screws 43, 43' mounted on shafts 44, 44' rotated by pinions 45, 45'. Such squeezing will permit ingress of material into the tanks but will prevent flow of solvent from the tank through the conduits 41, 41'.

The heavy fresh solvent is fed to the tanks through the pipes 47, 47' at the top of the tanks from any suitable source not shown and enriched solvent is discharged through the pipes 48, 48' at the bottoms of the tanks.

The lighter material rising through the heavier solvent will preferably be squeezed by the vertical conveyor screws 49, 49' at the upper end of the tanks and passed into a drier 50 in all respects similar to the drier 20 hereinabove described and is then by conveyor screw 51 passed into solvent eliminator 52 which is in all respects similar to the solvent eliminator 31 hereinabove described.

In the embodiment shown in Fig. 1, I preferably employ gasoline as the solvent while in the embodiment shown in Fig. 2 other well-known solvents of greater specific weight than gasoline and also of greater specific weight than the material to be treated is employed.

Having described my invention, I claim:—

1. A process of solvent extraction of oils, fats and other soluble constituents from materials containing the same, comprising the continuous feeding, through a plurality of diffusion zones of an extraction unit, of a solid oil-bearing material from a position and in a direction in which such material will be non-mechanically moved by potential energy from one end of said plurality of zones to the other, and will provide in said zones a given pressure, the continuous feeding through said plurality of zones of a solvent liquid in counter-pressure to the pressure of said material and in a direction opposite to the said movement of said material, independently circulating the liquid in each of said plurality of zones by heat, the discharging of solvent and oil at the end of said plurality of zones first mentioned, and the discharging of solid material at the opposite end.

2. A process of solvent extraction of oils, fats and other soluble constituents from materials containing the same, comprising the continuous feeding, through a plurality of diffusion zones of an extraction unit, of a solid oil-bearing material from a position and in a direction in which such material will be non-mechanically moved by potential energy from one end of each of said zones to the other, and will provide in said zones a given pressure, the continuous feeding through each of said zones of a solvent liquid in counter-pressure to the pressure of said material and in a direction opposite to the said movement of said material, independently conducting part of the liquid in each of said plurality of zones through external conduits from one level of each zone to another, independently applying heat to each of said conduits to circulate liquid in each of said plurality of zones, the discharging of solvent and oil at the end of said plurality of zones first mentioned, and the discharging of solid material at the opposite end.

3. A process of solvent extraction of oils, fats and other soluble constituents from materials containing the same, comprising the continuous feeding through a plurality of extraction zones in an extraction unit of solid oil-bearing material from a position and in a direction in which such material will be non-mechanically moved by gravity from one end of said plurality of zones to the other, and will provide in said zone a given pressure, the continuous feeding through said plurality of zones of said solvent liquid in counter-pressure to the pressure of said material and in a direction opposite to the said movement of said material, the independent conducting of part of the liquid in each of said zones through external conduits from one level of each zone to another level thereof, independently applying heat to said external conduits to circulate liquid in each of said zones, the discharging of solid material below said zones and the discharging of solvent and oil above the same.

MICHELE BONOTTO.